(12) United States Patent
Kumagai (10) Patent No.: US 7,061,642 B2
(45) Date of Patent: Jun. 13, 2006

(54) IMAGE PROCESSING APPARATUS, IMAGE PROCESSING METHOD, STORAGE MEDIUM, AND IMAGE INFORMATION PRINTING SYSTEM

(75) Inventor: Atsushi Kumagai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 848 days.

(21) Appl. No.: 09/949,876

(22) Filed: Sep. 12, 2001

(65) Prior Publication Data
US 2002/0030856 A1 Mar. 14, 2002

(30) Foreign Application Priority Data
Sep. 14, 2000 (JP) ............................ 2000-279854

(51) Int. Cl.
G06F 15/00 (2006.01)
G06F 13/00 (2006.01)

(52) U.S. Cl. ..................... 358/1.18; 358/537; 358/538; 358/448; 358/452; 358/453; 382/175; 382/256; 382/282; 382/291; 382/293

(58) Field of Classification Search ............... 358/1.18, 358/537, 538, 448, 452, 453; 382/294–298
See application file for complete search history.

(56) References Cited

U.S. PATENT DOCUMENTS 5,724,491 A * 3/1998 Kashihara ................. 358/1.18
6,301,013 B1 * 10/2001 Momose et al. ........... 358/1.15
6,453,078 B1 * 9/2002 Bubie et al. ............... 382/305
6,765,687 B1 * 7/2004 Tanaka et al. ............. 358/1.18
6,784,925 B1 * 8/2004 Tomat et al. .......... 348/207.11

OTHER PUBLICATIONS

Microsoft Office 6-On-1, 1994, USA.*

* cited by examiner

Primary Examiner—Twyler Lamb
Assistant Examiner—Alan Rahimi
(74) Attorney, Agent, or Firm—Fitzpatrick, Cella, Harper & Scinto (57) ABSTRACT

A printing system simultaneously prints both images and related information which is recorded together with the images. The print output may be unsuitable for use, depending on the combination of the image layout and positions where the related information is printed. To obviate this problem, an image processing apparatus lays out, on a recording medium, a plurality of images and information related to each of the images. The image processing apparatus has an image layout changing unit and an image layout controlling unit. The image layout changing unit changes a layout method for laying out the plurality of images. The image layout controlling unit determines, in accordance with the layout method changed by the layout changing unit, whether the related information is to be located within or outside areas of the associated images.

17 Claims, 9 Drawing Sheets

| IMAGE NUMBER 601 | FILE NAME 602 | PAGE NUMBER 603 | TRIMMING LEFT END 604 | TRIMMING UPPER END 605 | TRIMMING RIGHT END 606 | TRIMMING LOWER END 607 | IMAGE CENTER HORIZONTAL POSITION 608 | IMAGE CENTER VERTICAL POSITION 609 | IMAGE DISPLAY MAGNIFICATION 610 | IMAGE ROTATION ANGLE 611 | CHARACTER STRING 612 |
|---|---|---|---|---|---|---|---|---|---|---|---|
| 1 | IMG_0001.JPG | 1 | 0 | 0 | 800 | 600 | 300 | 400 | 100.0 | 90 | 2000.01.23 10:23:45 |
| 2 | IMG_0002.JPG | 1 | 50 | 0 | 350 | 600 | 300 | 1200 | 200.0 | 0 | 2000.01.23 10:24:05 |
| ... | | | | | | | | | | | |
| 10 | IMG_0010.JPG | 3 | 200 | 0 | 1000 | 600 | 900 | 400 | 100.0 | 270 | 2000.03.24 18:33:17 |

IMAGE PROCESSING APPARATUS, IMAGE PROCESSING METHOD, STORAGE MEDIUM, AND IMAGE INFORMATION PRINTING SYSTEM

BACKGROUND OF THE INVENTION

1. Field of the Invention

The present invention relates to a printing system for printing an image together with related information and more particularly, to control of a position where the related information is printed.

2. Description of the Related Art

Printing systems are known in which a plurality of images received from an image input apparatus are suitably laid out and printed on a single sheet of paper. In general, this kind of printing system is sorted into two types, according to the image layout method.

In one type of printing system, a user specifies the number of images to be printed on a single sheet of paper, so that a printing system automatically determines the size of the images, as well as the locations where the images are to be printed. This method is suitably used when at-a-glance check of many mages is desired, or when the sheet carrying the printed images is divided into pieces or segments of an identical size, each segment carrying one image.

In general, this type of printing system employs a seal paper dividable into 16 segments. This type of seal paper usually has 16 severable blocks arranged in four columns and four lines, each block when severed being usable as a seal. Papers are available having perforations formed along the boundaries of the blocks for easy severance. Printing of a multiplicity of images at a time on such a seal paper advantageously saves time and cost of the sheet.

In general, this type of printing system is designed to automatically trim or rotate independent images so that all the images are laid-out for printing in an equal size to fully occupy the printable areas available on the sheet for printing.

In another type of printing system, the user is allowed to freely select the printing conditions such as the printing position, size and the orientation of each image so that the printing system automatically arranges the images in accordance with the printing conditions selected by the user. This type of printing system advantageously enables free layout of the images based on the user's taste, although it requires laborious work for selecting the printing conditions for each of the images.

This type of printing system provides a print product which is equivalent to an album containing many snap photos and, therefore, can greatly reduce the work for producing two or more sets of albums of the same layout.

Printing systems are also known which print an image together with information that is related to the image and that has been simultaneously recorded with the recording of the image. For instance, there is a printing system which prints photographic images recorded by a camera together with the dates of the shots, so that the dates the photographs were taken can be easily recognized on the product print.

This kind of printing system, capable of printing images together with related information, can be sorted into two types, according to the position where the related is information is printed: namely, a printing system of a type that prints the related information in a marginal area outside the frame of the image, and a printing system of a type that prints the related information such that the related information is superimposed on a portion of the image.

A printing system is also known which permits, prior to execution of printing on a sheet, a manual adjustment of the positions where the related information is to be printed.

The printing systems of the kind described, which simultaneously prints images and related information recorded at the same time as the recording of images, may provide undesirable printing results depending on the print positions of the related information and the arrangement of the images.

This problem is encountered with, for example, a printing system which automatically sizes and arranges a plurality of images while printing information relating to the images on marginal regions outside the images. When the individual printed images are severed, therefore, the related information may be separated from the images. Consequently, the severed images have to be distributed or otherwise used without being accompanied by the related information. To obviate such a problem, it is necessary to take a suitable countermeasure such as manual readjustment of printing positions of the related information or reduction of the printed image size so as to preserve information printing regions within the printable areas of the blocks on the sheet.

A problem is also encountered with a printing system of the type which affords a user to select the printing positions and sizes of the images, while printing related information in a manner superimposed on a part of the associated image. When this type of system is used, it is necessary to manually change the printing position of the related information on all the images, in order that parts of the images are not hidden by the printed related information.

For instance, when the images are arranged to have the greatest possible size without preserving any margin for the printing of the related information, part of each image is undesirably hidden by the printed related information. Conversely, when margins are preserved for printing information such as date, the size of the images are undesirably reduced.

Figure 3:
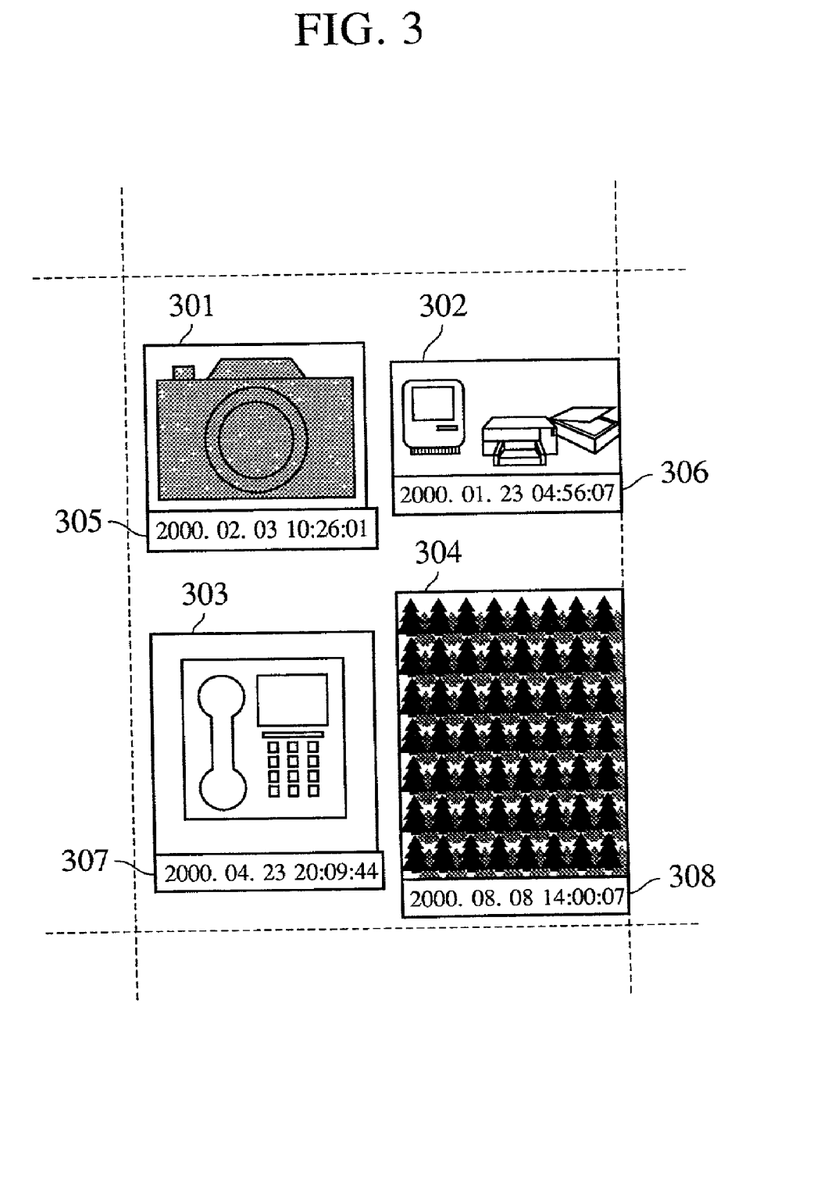
FIG. 3 is an illustration of a printing result obtained through a printing operation in a free layout mode.

FIG. 3 shows a layout of images used in a case where the requirement for maximizing the size of the images is not so critical. In this layout, all the images are oriented upright for easier at-a-glance observation, with some of the images having been rotated through 90°. This image layout affords sufficiently large marginal areas. However, superimposition of date information on the images makes it difficult to observe these images which have already been reduced in size.

Hitherto, no image processing method and apparatus have been proposed which permit easy determination as to whether information related to images is to be printed within or outside the images, depending on the arrangement of the images.

SUMMARY OF THE INVENTION

Accordingly, it is a primary object of the present invention to overcome at least one or all of the problems of the known art heretofore described.

Thus, an object of the present invention is to make it possible to easily set, in accordance with the layout of images, the locations where information related to the images are to be printed: namely, to make it easy to determine whether the related information is to be printed within or outside the images.

To this end, according to one aspect of the present invention, there is provided an image processing apparatus which lays out, on a recording medium, a plurality of images and information related to each of the images, comprising: an image layout changing unit for changing the layout method for laying out the plurality of images; and an image layout controlling unit which determines, in accordance with the layout method changed by the layout changing unit, whether the related information is to be located within or outside the areas of the images.

Another object of the present invention is to make it possible to easily set the location where the related information is to be printed, even when one of the images has been rotated in the image layout.

To this end, in the image processing apparatus of the invention, the layout controlling unit is configured to cause, when one of the images is rotated, the image layout changing unit to rotate the layout of the information related to the rotated image.

Still another object of the present invention is to make it possible to easily set the location of related information, in accordance with conditions such as the kind of the printing medium on which the images and related information are to be recorded and the layout of the images on this medium.

To this end, the image layout changing unit changes the layout of the images depending on the kind of the printing medium.

Further objects, features and advantages of the present invention will become apparent from the following description of the preferred embodiments with reference to the attached drawings.

DESCRIPTION OF THE PREFERRED EMBODIMENTS

A preferred embodiment of the present invention will be described in detail with reference to the accompanying drawings.

Figure 1:
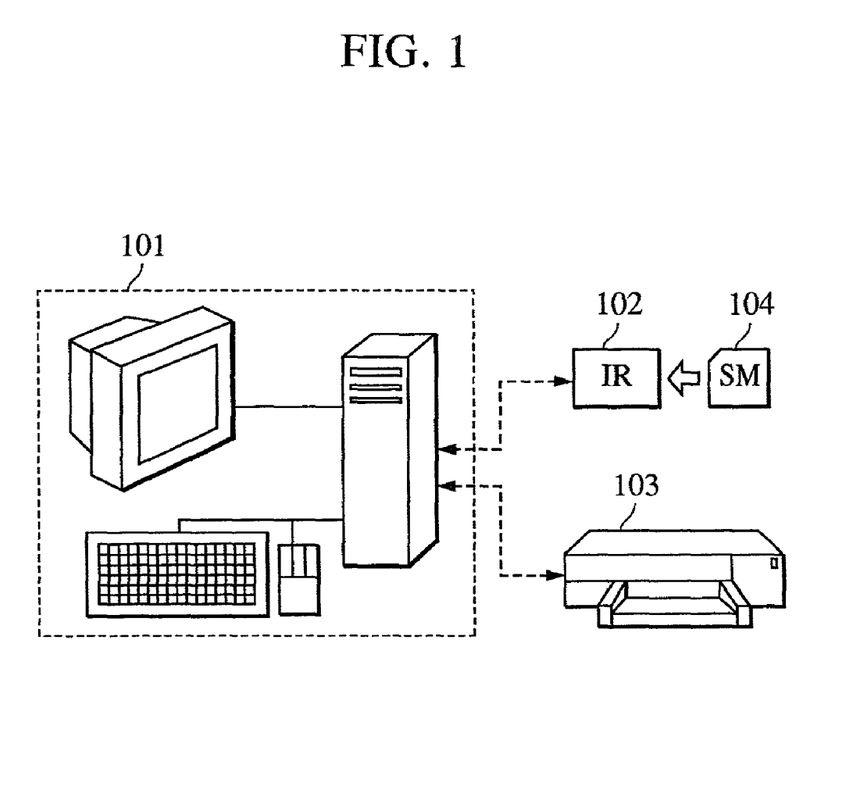
FIG. 1 is a diagrammatic illustration of a printing system as an embodiment of the present invention.

FIG. 1 shows the configuration of a printing system incorporating an embodiment of the present invention.

Referring to FIG. 1, a control unit 101 performs control of operation for receiving input from a user, delivering output to the user, as well as operation of various devices connected thereto. The printing system has an image reader (IR) 102 for reading images from a storage medium (SM) 104 storing images, and a printer 103 for printing the images on a printing medium such as a sheet of paper. The image reader 102 and the printer 103 are connected to the control unit 101 through an USB interface, respectively.

Figure 4:
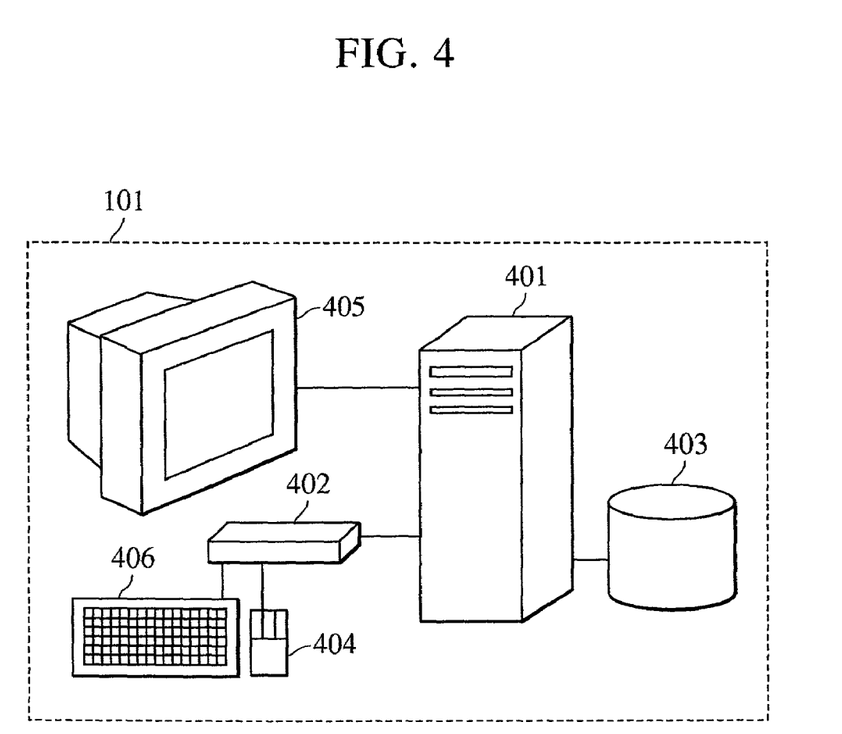
FIG. 4 is a diagrammatic illustration of a control unit incorporated in the printing system.

FIG. 4 shows the configuration of the control unit 101.

The control unit 101 has a computer 401 provided with an USB interface 402 to which a plurality of USB devices are connectable, and incorporates a hard disk 403. As previously stated, the image reader 102 and the printer 1103 are connected to the USB interface 402. The computer 401 has a monitor 405. A mouse 404 and a keyboard 406 are connected to the computer 401 through the USB interface. Thus, the user can operate the control unit 101 by means of the mouse 404 and the keyboard 406.

Images read from the image storage medium 102 are stored in the hard disk 403 in the form of a JPEG file. The layout information concerning the manner of layout of the images is stored in the form of a table.

Figure 6:
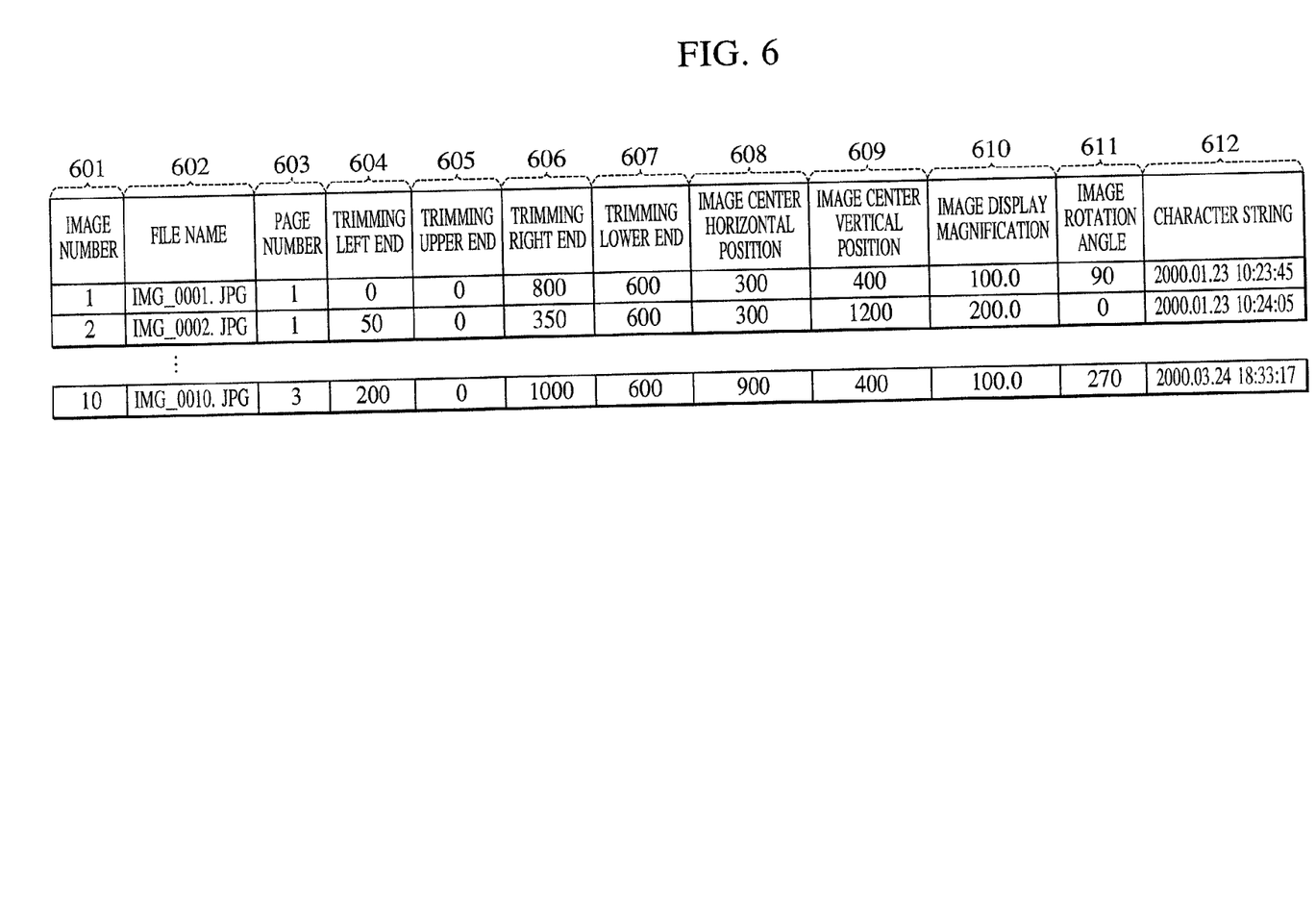
FIG. 6 is an illustration of an image layout table stored in a hard disk.

FIG. 6 shows, by way of example, the table of the image layout information. When the image storage medium 104 is read by the image reader 102, the images stored in the storage medium 104 are copied to the hard disk 403, so that the image layout information in the table is wholly updated.

The image layout information includes the following items of information: an image number 601, an image file name 602, a page number 603 of the page containing an image, coordinates 604 of the left end of the image trimming region, coordinates 605 of the upper end of the image trimming region, coordinates 606 of the right end of the image trimming region, and the coordinates 607 of the lower end of the image trimming region, horizontal position 608 of the image center, vertical position 609 of the image center, display magnification 610 of the image, rotation angle 611 of the image, and the character string 612 of related information.

The control unit 101 has two layout modes: namely, a fixed layout mode in which images are automatically laid out and printed in a suitable image size, and a free layout mode which permits a user to freely select the print positions and sizes of the images at the user's discretion. These layout modes are switchable by the user. The operation performed by the control unit partly varies according to the layout mode selected by the user.

In the illustrated embodiment, the "fixed layout mode" is a mode in which a printing medium such as a printing paper sheet is divided into a plurality of regions or blocks, and the images are magnified or demagnified into the size of the blocks and arranged without leaving any margin between adjacent images. Thus, no margin is available for printing the related information.

In contrast, in the "free layout mode", margins are set between adjacent images as initial values to permit printing of related information therein, although this mode allows the user to freely determine the layout of the images.

Thus, in the illustrated embodiment, the layout method is changed in accordance with the switching of the layout mode, and whether the related information is to be located within the area of the images or outside the areas of the images is determined in accordance with the change in the layout method.

Figure 5:
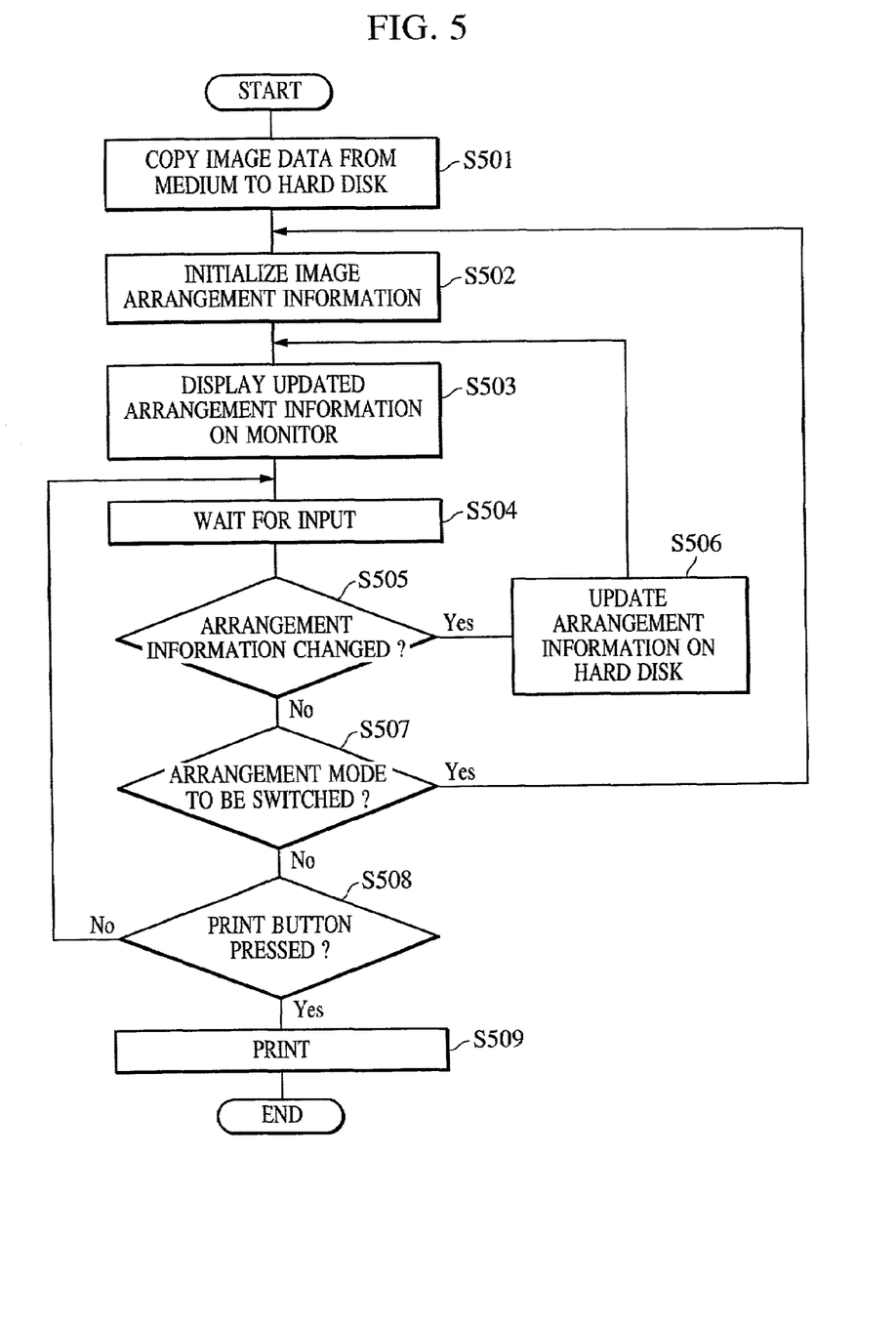
FIG. 5 is a flowchart showing the process performed by the control unit.

FIG. 5 shows a basic process which is performed by the control unit 101 of the printing system embodying the present invention regardless of whether the layout mode is the fixed layout mode or the free layout mode.

In Step S501 of the process, the control unit 101 determines whether a storage medium 104 has been read by the reader 102. If the storage medium 104 has been read, data of all the images stored in the storage medium 104 is copied into the hard disk 403, and the layout information items such as the image number 601 and the image file name 602 are recorded. If any related information such as the photographing date has been stored together with the images, such related information is also recorded in the form of character strings 612.

In Step S502, the image layout information is initialized and stored in the hard disk 403. The initial values of the image layout information vary according to the selected image layout mode.

Step S503 causes the monitor 405 to display a layout information update screen, to enable the user to update the image layout information recorded in the hard disk 403.

Upon completion of the display of the layout information update screen, the control unit 101 proceeds with the process to Step S504 which allows the user to enter any instruction by means of the mouse 404. If any instruction is entered, the process advances to Step S505.

Step S505 determines whether the entered instruction is to change, i.e., update, the layout information. If the answer is affirmative, the process advances to Step S506 in which the updated image layout information is recorded in the hard disk 403. The process then returns to Step S503, otherwise the process advances to Step S507.

Step S507 determines whether the entered instruction is to switch the image layout mode. If the answer is affirmative, the process returns to Step S502 which initializes the layout information, otherwise the process advances to Step S508.

Step S508 determines whether the entered instruction is a printing instruction for printing the images. If the answer is affirmative, the process advances to Step S509 in which the images stored in the hard disk 403 are printed in accordance with the image layout information which also is-stored in the hard disk 403, otherwise the process returns to Step S504 to wait for a further entry of instruction.

Step S502 sets different initial values of image layout information for different image layout modes.

Figure 7:
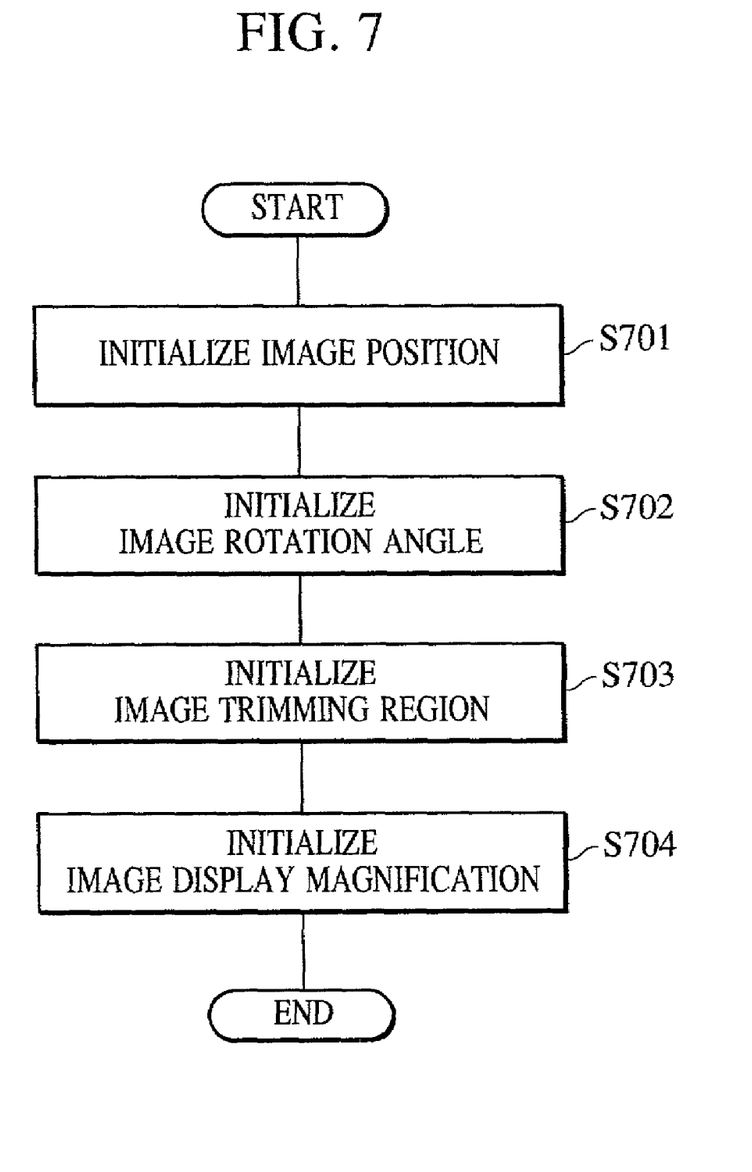
FIG. 7 is a flowchart showing an initializing process performed by the control unit in a step of the process shown in FIG. 5.

The processing performed in the initializing step S502 for initializing the layout information will be described in detail with reference to FIG. 7.

The processing begins with Step S701 which initializes the position of images. By way of example, the illustrated embodiment treats four images which are to be located at the left upper corner, right upper corner, left lower corner and the right lower corner of a sheet which is used as the printing medium. To this end, Step S701 sets three values for each image: namely, the page number 603 of the page containing the images, horizontal position 608 of the center of the image, and the vertical position 609 of the center of the image. The illustrated quadrant arrangement of the images is only illustrative. Thus, the initial values may preferably be automatically adjusted depending on factors such as the size of the printing medium, kind of the printing medium, and so forth.

For instance, the initialization may be performed such that the quadrant image layout is used when the printing medium is an A-4 size sheet, whereas, when the printing medium is a B-5 size sheet, a columnar arrangement having only two images is used.

The printing medium may be a sheet having perforations which divide the area of the sheet into four blocks: namely, an upper left block, an upper right block, a lower left block and a lower right block. In such a case, the initialization is automatically performed to assign images to these four blocks. Thus, the present invention permits the use of a printing medium on which printing regions have already been defined.

Thus, the initial layout of images is determined based on the size and kind of the printing medium and based also on the layout mode, and the printing locations of the related information are also determined automatically in accordance with the initial image layout.

Then, Step S702 is executed to initialize the angles of rotation of the images.

When the free layout mode has been selected in the illustrated embodiment, the images are initially held in their original orientations, so that the rotation angles 611 of the images are set to zero. When this layout mode is used, the user can, of course, freely rotate the images by manual operation after the initialization.

When the fixed layout mode has been selected in this embodiment, rotation angles of the images are initially set to 0° or 90° so that the direction of the longer side of each image coincides with the direction of the longer side of the printable area on the printing medium. For instance, when the printing area has a longer vertically extending axis, the rotation angle 611 of the image to be printed in this printing area is set to 0° if the image has a longer vertically extending axis, and to 90° if the image has a horizontally extending longer axis.

Subsequently, Step S703 is executed to initialize the image trimming regions.

When the free layout mode has been selected in the illustrated embodiment, trimming of the images is not initially executed, so that the coordinates 604 of the left end of the trimming region and the coordinates 605 of the upper end of the trimming region are set to 0 (zero), while the coordinates 606 of the right end of the trimming region and the coordinates 607 of the lower end of the trimming region are set to values corresponding to the width and the height of the image file, respectively.

When the fixed layout mode is used in this embodiment, trimming is conducted such that the aspect ratio, i.e., the ratio between the height and the width, of the image is equal to that of the printing area. The trimming is initially performed such that either the top and bottom ends or the left and right ends of the image is cut and trimmed by an equal amount. The coordinates 604 of the left end of the trimming region, coordinates 605 of the upper end of the trimming region, coordinates 606 of the right end of the trimming region and the coordinates 607 of the lower end of the trimming regions are set so as to minimize the areas of the image that are severed and removed by the trimming.

Step S704 initializes the display magnification of the images.

When the free layout mode is used in this embodiment, the area in which an image is printable is set to be 10% smaller than the whole block allocated to each image, i.e., 10% smaller than the area which has a width ½ that of the entire printable area of the printing sheet and a height which is ½ the height of the entire printable area. This magnification affords a marginal area in which information related to each image is printable.

When the fixed layout mode is used, the display magnification 610 of the image is set so that each image is printed to fully occupy the quarter area of the entire printable area on the printing sheet, i.e., to fill up the area having a width which equals to ½ that of the entire printable area and a height which equals to ½ that of the entire printable area.

Figure 8:
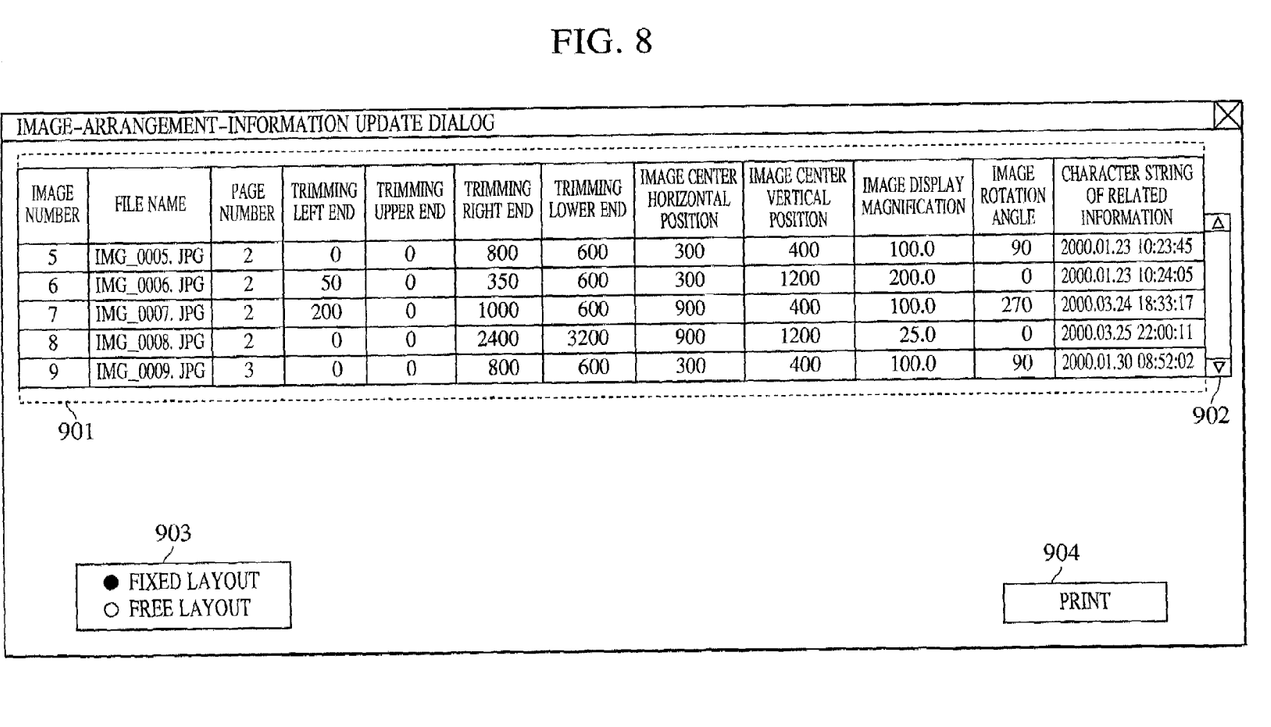
FIG. 8 is an illustration of an image layout update screen displayed on a monitor.

FIG. 8 shows, by way of example, a layout information update screen which is displayed on the monitor 405 in Step S503.

A table 901 contains a list of pieces of layout information associated with the respective images recorded in the hard disk 403. The user is allowed to change the value of any item in any one of pieces of layout information, by clicking on the item by the mouse 404 and entering a new value through the keyboard 406.

When the size of the list of the layout information contained in the table 901 is too large to be displayed, the user can scroll the screen to bring the layout information of the desired image into the display area.

Switching between the layout mode of the printing system between the fixed layout mode and the free layout mode is possible by clicking on a changing button 903 on the display.

When the user clicks on a printing button 904, printing data is sent to the printer 103 in accordance with the layout information.

Any invalid values entered into the table 901 is neglected. For instance, when values entered as the coordinates 609 of the vertical position of an image fall out of the printable area on the printing sheet, or when angular values other than 0°, 90° or a multiple of 90° is entered as the image rotation angle 610, such values are regarded as being invalid and are neglected accordingly. The items of each piece of layout information may be linked together such that, when the value of one item is changed, values of other items in the piece of layout information pertaining to an image are automatically changed correspondingly. For instance, when the display magnification 610 of an image is changed while the system is operating in the fixed layout mode, values of the coordinates 604, 605, 606 and 607 of the left, upper, right and lower ends of the trimming region are automatically changed so as not to cause the printed image to protrude from the designated printing area allocated to the image.

In the illustrated embodiment, a table that permits direct entry and change of values of layout information is displayed as the layout information update screen. This, however, is only illustrative and the update or change of the values of layout information may be implemented by using an interface that graphically displays the image layout on the screen to permit the user to change the values of layout information by a suitable operation such as a dragging operation of the mouse 404.

Figure 9:
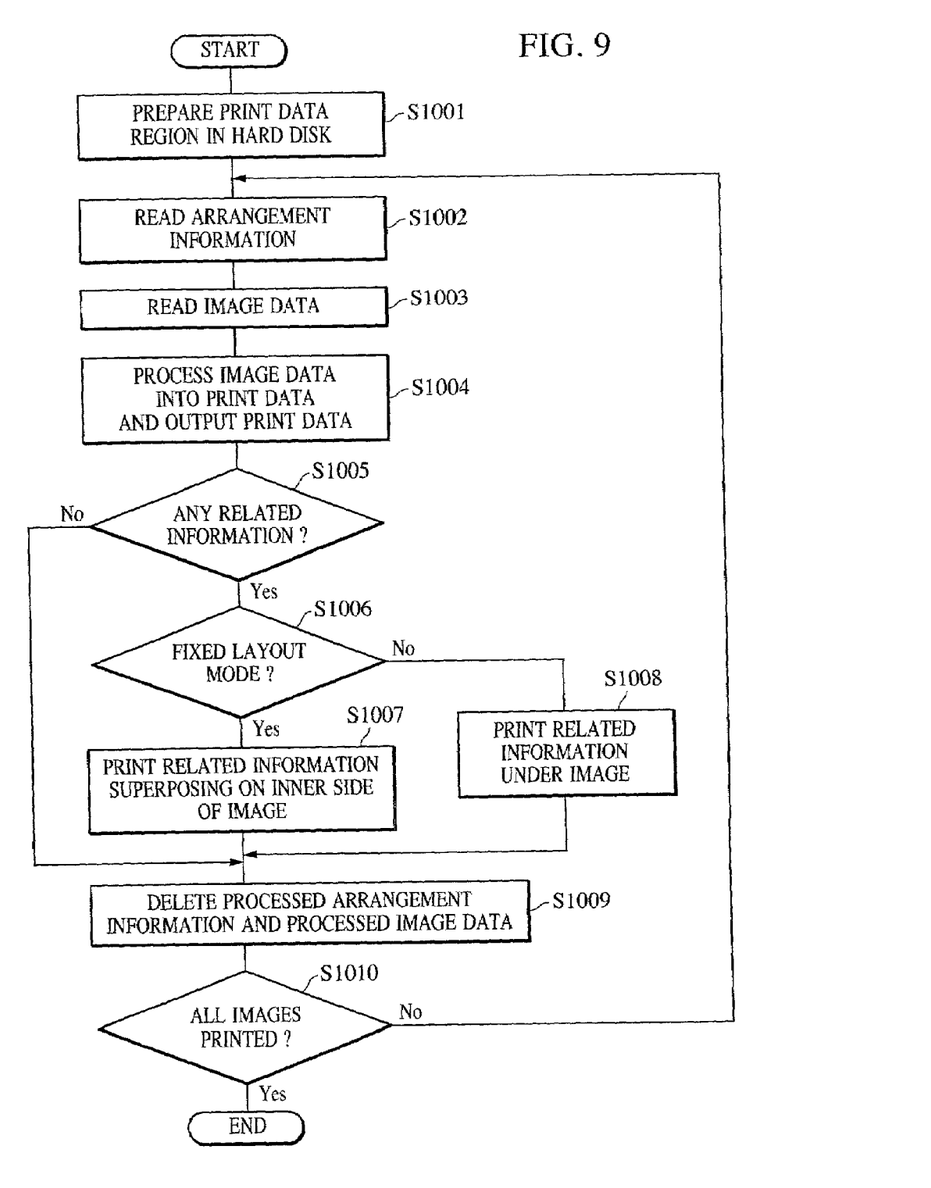
FIG. 9 is a flowchart showing a printing process performed by the control unit in a step of the process shown in FIG. 5.

A description will now be given of the printing processing executed in Step S509, with specific reference to FIG. 9.

The processing begins with Step S1001 in which a data area is preserved in the hard disk 403, for temporarily storing the printing data to be transmitted to the printer 103.

Step S1002 reads the piece of layout information concerning the first one of the image in the image layout information table stored in the hard disk 403.

Step S1003 reads from the hard disk 403 the data of the image designated by the image file name 602 of the layout information.

Step S1004 magnifies or demagnifies, in accordance with the display magnification 610 contained in the image layout information, the image data that has been trimmed based on the coordinates 604, 605, 606 and 607 of the left, upper, right and lower ends of the image trimming region. This step also executes rotation of the magnified or demagnified image in accordance with the image rotation angle 611 contained in the image layout information. The image data thus obtained is recorded in the hard disk 403 so as to be used as the printing data so that the image data is to be printed at a position designated by the horizontal and vertical positions 608, 609 of the image center on a page which is specified by the page number 603 which designates the page in which the image is to be printed.

The process then advances to Step S1005 which determines whether any character string 612 of related information has been recorded. If no such character string has been recorded, the process skips to Step S1009.

Conversely, if a character string 612 of related information has been recorded, the process advances to Step S1006 which examines the image layout mode in which the printing system is operating. If the printing system is in the fixed layout mode, the process advances to Step S1007, whereas, if the present layout mode is the free layout mode, the process skips to Step S1008.

Step S1007 modifies the printing data such that the information relates to an image is printed by being superimposed on the image. In this operation, the location and the direction of the character string to be printed are changed in accordance with the angle 611 of rotation of the image. If the rotation angle is 0°, the character string is printed without being rotated, so as to extend rightward from a position under the left lower portion of the image. When the rotation angle is 90°, the character string is rotated 90° and printed so as to extend downward from a position near the left upper end of the image. When the rotation angle is 180°, the character string is rotated 180° and printed so as to extend leftward from a position near the right upper end of the image. When the rotation angle is 270°, the character string is rotated 270° and printed so as to extend downward from a position near the right upper end of the image.

In Step S1008, the printing data in the hard disk 403 is changed so that the related information may be printed outside the image. In this case, the character string representing the related information is printed at a position right below the image, without being rotated.

In Step S1009, the piece of the image layout information concerning the first image and the corresponding image data file are deleted from the hard disk 403.

Step S1010 determines whether any data still remains in the image layout information table. The image layout information table is empty if all the data has been printed and deleted. In such a case, the processing is finished after sending the printing data recorded in the hard disk 403 to the printer 103. If any data remains in the image layout information table, the process returns to Step S1002 to commence the operation for printing the next image, i.e., the image defined by the remaining data.

Figure 2:
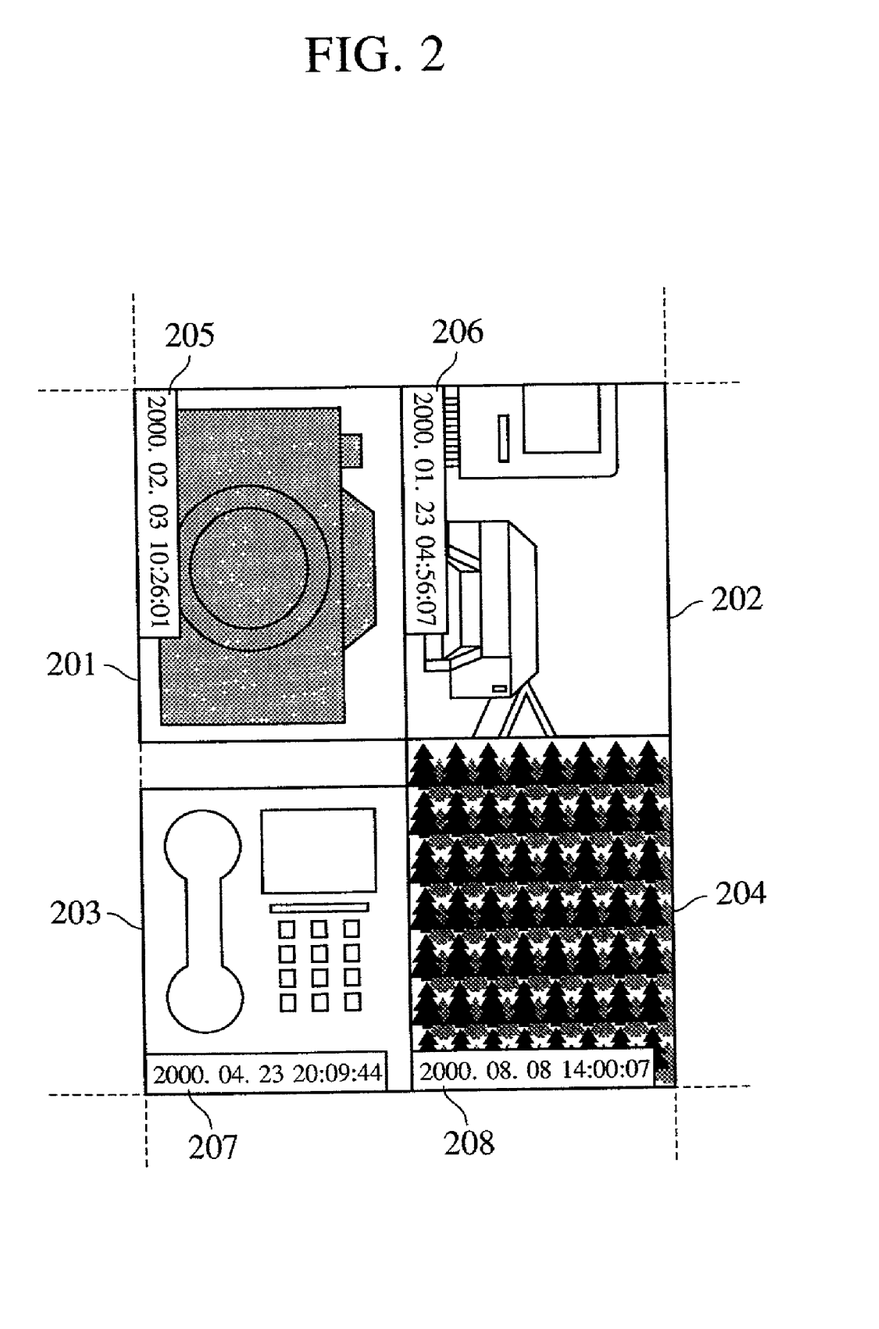
FIG. 2 is an illustration of a printing result obtained through a printing operation in a fixed layout mode.

FIG. 2 shows, by way of example, a printing result obtained through the printing operation in the fixed layout mode. Images 201, 202, 203 and 204 have been printed on the printing medium in accordance with the recorded information.

In this case, the printing medium is a sheet of paper having an entire printable area of 1200 pixels in the horizontal or line direction and 1600 pixels in the vertical or columnar direction.

The image 201 is composed of 800 pixels in the line direction and 600 pixels in the columnar direction. This image is disposed in the left upper quarter of the sheet in accordance with the procedure previously described in connection with FIG. 7. In this case, the image center positions are represented by (300, 400), the rotation angle is 90°, the trimming region is expressed by {(0,0)-(800,600)} and the magnification is 100%. The date 205 on which the image 201 was taken is printed by a character string which has been rotated 90° to extend downward from a position near the left upper end of the image.

The image 202 is composed of 1200 pixels in the line direction and 600 pixels in the columnar direction. This image is disposed in the right upper quarter of the sheet in accordance with the procedure previously described in connection with FIG. 7. In this case, the image center positions are represented by (900, 400), the rotation angle is 90°, the trimming region is expressed by {(200,0)-(1000,600)} and the magnification is 100%. The date 206 on which the image 202 was taken is printed by a character string which has been rotated 90° to extend downward from a position near the left upper end of the image.

The image 203 is composed of 400 pixels in the line direction and 400 pixels in the columnar direction. This image is disposed in the left lower quarter of the sheet in accordance with the procedure previously described in connection with FIG. 7. In this case, the image center positions are represented by (300, 1200), the rotation angle is 0°, the trimming region is expressed by {(50,0)-(350,400)} and the magnification is 200%. The date 207 on which the image 203 was taken is printed by a character string extend rightward from a position near the left end of the image, without being rotated.

The image 204 is composed of 2400 pixels in the line direction and 3200 pixels in the columnar direction. This image is disposed in the right lower quarter of the sheet in accordance with the procedure previously described in connection with FIG. 7. In this case, the image center positions are represented by (900, 1200), the rotation angle is 0°, the trimming region is expressed by {(0,0)-(2400,3200)} and the magnification is 25%. The date 208 on which the image 204 was taken is printed by a character string which extends rightward downward from a position near the left lower end of the image, without being rotated.

The print thus obtained may be cut by scissors so as to severe the four quadrants from one another, whereby four independent images each carrying the printed related information, i.e., the photographing date, are obtained for distribution.

FIG. 3 shows, by way of example, a printing result obtained through the printing operation in the free layout mode. Images 301, 302, 303 and 304 have been printed on the printing medium in accordance with the recorded information.

In this case, the printing medium is a sheet of paper on having an entire printable area of 1200 pixels in horizontal or line direction and 1600 pixels in the vertical or columnar direction.

The image 301 is composed of 800 pixels in the line direction and 600 pixels in the columnar direction. This image is disposed in the left upper quarter of the sheet in accordance with the procedure previously described in connection with FIG. 7. In this case, the image center positions are represented by (300, 400), the rotation angle is 0°, the trimming region is expressed by {(0,0)-(800,600)} and the magnification is 67.5%. The date 305 on which the image 301 was taken is printed below the image, without being rotated.

The image 302 is composed of 1200 pixels in the line direction and 600 pixels in the columnar direction. This image is disposed in the right upper quarter of the sheet in accordance with the procedure previously described in connection with FIG. 7. In this case, the image center positions are represented by (900, 400), the rotation angle is 0°, the trimming region is expressed by {(0,0)-(1200,600)} and the magnification is 45%. The date 306 on which the image 302 was taken is printed below the image, without being rotated.

The image 303 is composed of 400 pixels in the line direction and 400 pixels in the columnar direction. This image is disposed in the left lower quarter of the sheet in accordance with the procedure previously described in connection with FIG. 7. In this case, the image center positions are represented by (300, 1200), the rotation angle is 0°, the trimming region is expressed by {(0,0)-(400,400)} and the magnification is 135%. The date 307 on which the image 303 was taken is printed below the image without being rotated.

The image 304 is composed of 2400 pixels in the line direction and 3200 pixels in the columnar direction. This image is disposed in the right lower quarter of the sheet in accordance with the procedure previously described in connection with FIG. 7. In this case, the image center positions are represented by (900, 1200), the rotation angle is 0°, the trimming region is expressed by {(0,0)-(2400,3200)} and the magnification is 22.55%. The date 308 on which the image 304 was taken is printed below the image without being rotated.

Thus, when the free layout mode is used to permit the user to freely appoint the printing positions and sizes of the images, the information relates to each image can automatically be printed so as not to be superimposed on the associated image.

It is to be noted, however, that the image processing apparatus is not limited to the type which permits free selection between the fixed layout mode and the free layout mode.

For instance, the fixed layout mode may be modified to allow the user to select demagnification of the image so as to create a marginal region. In such a case, the arrangement may be such as to automatically determine or in accordance with a manual instruction entered by the user whether the related information is to be printed within or outside the area of the image.

The arrangement may also be such that the different magnifications or demagnifications apply to the columnar or vertical direction and the line or horizontal directions. In such a case, whether the related information is to be printed along a longer side or the shorter side of the image, and whether the related information is to be located within or outside the image area, may be manually or automatically selected in accordance with the difference in the magnification between the vertical and horizontal directions.

The unit rotation angle is not limited to 90°. For instance, a 30° clockwise rotation of a rectangular image with horizontally lying longer axis creates a small marginal space at the lower left corner. It is possible to allocate the related information to this marginal area, with or without a slight overlap on the image.

Preferably, the print size of the related information is controllable in accordance with the size of the marginal space and/or the size of the image. Such a function advantageously provides a neat appearance of the combined print combining the image and the related information.

This also serves to avoid a mismatch of size between the image and the character strings representing the related information, e.g., a too large length of the character strings for a given size of image.

The present invention my be implemented in the form of a system composed of a plurality of devices such as a host computer, interfaces, a reader, a printer and so on, or may be incorporated in an independent device such as a copying machine or a facsimile apparatus.

The functions of the embodiment heretofore described may be implemented by software program codes. Such program codes may be supplied to a computer in an apparatus connected to various kinds of devices or in a system linking such devices so as to be stored in the computer (CPU or MPU) of the apparatus or the system. The computer then operates and controls these devices in accordance with the stored program. Such a way of implementation of image processing also falls within the scope of the present invention.

In such a case, the software program codes implement the functions of the described embodiment. Thus, the program codes per se constitute one aspect of the present invention, as well as means for supplying the program codes to the computer, e.g., a computer-readable storage medium.

The storage medium storing the program codes may be a floppy disk, a hard disk, an optical disk, an optomagnetic disk, a CD-ROM, a magnetic tape, a non-volatile memory card, a ROM, or the like.

The program codes when executed on a computer may implement the functions of the described embodiment by themselves, or in cooperation with another application software or an operating system (OS) running on the computer. It will be clear that the program codes that implements the required functions through cooperation with an OS or another application are also included in the scope of the present invention.

The arrangement may be such that the supplied program codes are stored in a memory provided in a function extension board of the computer or a function extension unit connected to the computer, and a processing unit such as a CPU provided on the function extension board or the function extension unit executes part or the whole of the processing, thereby implementing the functions of the described embodiment. Such an arrangement also falls within the scope of the present invention.

As will be understood from the foregoing description, the present invention offers the following advantages.

In the mode in which images are automatically and suitably sized and laid out, the related information corresponding to the images is automatically superimposed on the associated images and printed together with the images.

In the mode which permits the user to freely appoint the printing locations and sizes of images, information relates to each image is automatically printed in a marginal area preserved along a side of the image.

It is thus possible to produce printing output that suits the use intended by the user.

When the layout of a plurality of images is changed, whether the related information such as date information is to be printed inside or outside the associated image is automatically determined. Thus, the arrangement of prints of the related information can be automatically optimized in accordance with the layout method set by the user.

For instance, when a priority is given to maximization of the image print size while eliminating marginal areas as possible as shown in FIG. 2, superimposition of related information on the image is permissible. In such a case, the related information is printed by being superimposed on a part of the image. When it is desired to have all the images stand upright for easier at-a-glance observation as shown in FIG. 3, marginal areas are created while the image sizes are reduced in some cases. Such marginal areas can effectively be used as the areas for printing the information related to the images, so that the images are printed without being partly hidden by the printed related information.

According to the present invention, the user can select or switch the image layout method. Different initial values are set for the related information, depending on the layout method selected by the user. The user can then freely change the values to alter the locations and the sizes of the characters of the related information. It is therefore possible to optimize the layout of images and related information without requiring any specific skill and experience. In addition, the user once skilled and experienced can enjoy a greater versatility of image processing operations.

Further, the location and the direction of the characters representing the related information can also be rotated in accordance with the rotation of the associated image. It is therefore possible to obtain a print of images which are laid out for easier at-a-glance observation.

The image processing apparatus of the present invention is particularly useful and effective when it is configured to automatically switch the layout method in accordance with the kind or nature of the printing medium, e.g., a seal paper with an adhesive or a sheet having perforations which divide the printable area into a plurality of blocks for easy severance.

Although in the foregoing description the related information has been described in the context of date and time, such information is not exclusive and may include one or more items of attribute information such as a shutter speed, image size, whether a flashlight was used, and so on.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus which lays out, on a recording medium, a plurality of images and information related to each of the images, said apparatus comprising:
    image layout selecting means for selecting from at least two image layout modes an image layout mode for laying out the plurality of images; and
    determining means for determining, in accordance with the layout mode selected by said image layout selecting means, whether the related information is to be located within or outside areas of the associated images.

2. An image processing apparatus according to claim 1, wherein said determining means causes, when one of the images is rotated, said image layout selecting means to rotate the layout of the information related to the rotated image.

3. An image processing apparatus according to claim 1, further comprising:
    printing means for printing, on a printing medium, a page carrying the images and the related information laid out thereon.

4. An image processing apparatus according to claim 3, wherein said image layout selecting means selects the image layout mode in accordance with a kind of the printing medium.

5. An image processing apparatus according to claim 3, wherein the image layout modes include a marginless mode which arranges the plurality of images without leaving any marginal region between adjacent images.

6. An image processing apparatus according to claim 5, wherein, when the printing is performed with the images laid out in accordance with the marginless mode, said determining means performs control such that the related information related to the respective images are printed within the areas of the associated images.

7. An image processing apparatus according to claim 3, wherein the image layout modes include a margin mode which arranges the plurality of images such that marginal regions are formed between adjacent images.

8. An image processing apparatus according to claim 7, wherein, when the printing is performed with the images laid out in accordance with the margin mode, said determining means performs control such that the related information is disposed outside the area of the associated image.

9. An image processing method which lays out, on a recording medium, a plurality of images and information related to each of the images, said method comprising:
   an image layout selecting step of selecting from at least two image layout modes an image layout mode for laying out the plurality of images; and
   a determining step of determining, in accordance with the layout mode selected in said image layout selecting step, whether the related information is to be located within or outside areas of the associated images.

10. An image processing method according to claim 9, wherein said determining step causes, when one of the images is rotated, the layout of the information related to the rotated image to rotate.

11. An image processing method according to claim 9, further comprising:
   a printing step of printing, on a printing medium, a page carrying the images and the related information laid out thereon.

12. An image processing method according to claim 11, wherein said image layout selecting step selects the image layout mode in accordance with a kind of the printing medium.

13. An image processing method according to claim 11, wherein the image layout modes include a marginless mode which arranges the plurality of images without leaving any marginal region between adjacent images.

14. An image processing method according to claim 13, wherein, when the printing is performed with the images laid out in accordance with the marginless mode, said determining step performs control such that the related information related to the respective images is printed within the areas of the associated images.

15. An image processing method according to claim 11, wherein the image layout modes include a margin mode which arranges the plurality of images such that marginal regions are formed between adjacent images.

16. An image processing method according to claim 15, wherein, when the printing is performed with the images laid out in accordance with the margin mode, said determining step performs control such that the related information is disposed outside the area of the associated image.

17. A storage medium storing a program for enabling a computer to implement the image processing method of claim 9.

* * * * *

UNITED STATES PATENT AND TRADEMARK OFFICE
CERTIFICATE OF CORRECTION

| | | |
|---|---|---|
| PATENT NO. | : 7,061,642 B2 | |
| APPLICATION NO. | : 09/949876 | |
| DATED | : June 13, 2006 | |
| INVENTOR(S) | : Kumagai | |

It is certified that error appears in the above-identified patent and that said Letters Patent is hereby corrected as shown below:

TITLE PAGE AT ITEM [56] REFERENCES CITED:
Other Publications, "6-On-1," should read --6-in-1,--.

COLUMN 1:
Line 62, "is" should be deleted.

COLUMN 4:
Line 5, "1103" should read --103--.

COLUMN 5:
Line 30, "is-stored" should read --is stored--.

COLUMN 8:
Line 11, "relates" should read --related--.

COLUMN 9:
Line 15, "extend" should read --extending--.
Line 30, "severe" should read --sever--.
Line 39, "on" should be deleted.

COLUMN 10:
Line 17, "relates" should be --related--.

UNITED STATES PATENT AND TRADEMARK OFFICE
CERTIFICATE OF CORRECTION

PATENT NO. : 7,061,642 B2
APPLICATION NO. : 09/949876
DATED : June 13, 2006
INVENTOR(S) : Kumagai It is certified that error appears in the above-identified patent and that said Letters Patent is hereby corrected as shown below:

<u>COLUMN 11</u>:
Line 17, "implements" should read --implement--.
Line 37, "relates" should read --related--.
Line 49, "as" should read --as much as--.

Signed and Sealed this

Twentieth Day of May, 2008

JON W. DUDAS
*Director of the United States Patent and Trademark Office*